(12) United States Patent
Miyaoh

(10) Patent No.: US 6,682,080 B2
(45) Date of Patent: Jan. 27, 2004

(54) CYLINDER HEAD GASKET

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/193,184

(22) Filed: Jul. 12, 2002

(65) Prior Publication Data

US 2003/0011139 A1 Jan. 16, 2003

(30) Foreign Application Priority Data

Jul. 13, 2001 (JP) ........................................ 2001-213608

(51) Int. Cl.$^7$ ................................................ F02F 11/00
(52) U.S. Cl. ........................ 277/592; 277/594; 277/596
(58) Field of Search ................................. 277/591–598

(56) References Cited

U.S. PATENT DOCUMENTS

| | | | | |
|---|---|---|---|---|
| 4,968,045 A | * | 11/1990 | Abe et al. ................... | 277/592 |
| 5,354,074 A | * | 10/1994 | Jinno ......................... | 277/592 |
| 5,431,418 A | * | 7/1995 | Hagiwara et al. ........... | 277/592 |
| 5,435,575 A | * | 7/1995 | Udagawa .................... | 277/592 |
| 5,582,415 A | * | 12/1996 | Yoshida et al. .............. | 277/592 |
| 5,634,646 A | * | 6/1997 | Miyaoh ....................... | 277/592 |
| 5,938,208 A | * | 8/1999 | Yoshida et al. .............. | 277/592 |
| 6,279,916 B1 | * | 8/2001 | Stecher ....................... | 277/592 |
| 6,517,085 B2 | * | 2/2003 | Udagawa et al. ........... | 277/592 |
| 6,550,782 B2 | * | 4/2003 | Okazaki et al. ............. | 277/592 |

* cited by examiner

*Primary Examiner*—Anthony Knight
*Assistant Examiner*—Vishal Patel
(74) *Attorney, Agent, or Firm*—Kanesaka & Takeuchi

(57) ABSTRACT

A cylinder head gasket is formed of a single metal base plate for sealing between a cylinder head and a cylinder block of an internal combustion engine. The cylinder head gasket has a primary sealing portion including a grommet or shim around a cylinder bore, and a secondary sealing portion outside the primary sealing portion. The secondary sealing portion is formed of a bead and a foamed coating layer coated on one side or both sides of the bead to cover at least a portion of the bead in a belt shape.

6 Claims, 4 Drawing Sheets

CYLINDER HEAD GASKET

BACKGROUND OF THE INVENTION AND RELATED ART STATEMENT

The invention relates to a cylinder head gasket formed of a single metal base plate, which is installed between two members, such as a cylinder head and a cylinder block, of an internal combustion engine to seal therebetween.

When a joint surface between the cylinder head and the cylinder block (cylinder body) of the engine of the automobile is sealed, the cylinder head gasket is installed therebetween to seal combustion gas, cooling water and the like.

In view of demand for a light weight and low cost of the engine, a structure of the cylinder head gasket has been shifted to a simple type formed of a single metal base plate from a laminated type having a number of metal plates. Due to a single plate structure, only limited types of materials can be used.

In the laminated type metal plate gasket, a sealing member, such as a bead, grommet and shim, can be combined as necessity and provided in double for effective sealing. However, in the single plate gasket, a type and a number of sealing members are limited, so that a simplified sealing device has to be used. Moreover, an area available for the sealing device has been limited with reduction of an engine size.

As shown in FIG. 5, the cylinder head gasket is formed to have a shape of an engine member such as a cylinder block. The cylinder head gasket includes holes 2 for cylinder bores (hereinafter referred to simply as "cylinder bore 2"); fluid holes 3, 4 for circulating cooling water and engine oil (hereinafter referred to simply as "fluid holes 3, 4"); and bolt holes 5 for tightening bolts and the like. Also, sealing devices, such as beads 12, 13, with respect to the respective holes to be sealed are provided.

Although the same gasket is used to seal between the engine components, a different sealing property is required to seal the different holes. At the cylinder bores 2, it is required to seal the combustion gas with a high temperature and a high pressure, while a fluid with a relatively low temperature and a low pressure needs to be sealed at the fluid holes 3.

An arc shape bead 12 with a narrow width, which is formed of a material with elasticity for fitting to an irregular surface, is provided around the cylinder bore 2. Also, the cylinder bore 2 is surrounded by the bolt holes 5. Bolts are inserted into the bolt holes 5 to tighten the cylinder head and the cylinder block by applying a large pressure.

A bead 13 is provided around the fluid hole 3 to seal the same. Depending on a structure of the engine, the fluid hole 3 may be formed outside an area surrounded by the bolt holes 5. In this case, a pressing force of the tightening bolts is applied on only one side of the fluid hole 3, so that the tightening force becomes small. To solve the problem, a higher bead, a narrower bead, or a pointed bead has been used.

Further, to seal a small uneven surface like a tool mark or the like formed on a sealing surface of the engine member, such as the cylinder head and the cylinder block, a micro seal coating made of rubber, such as a NBR rubber and a fluoro rubber, is applied to entire surfaces on both sides of the gasket.

Since the micro seal coating generally has a hardness of 2H-4B in pencil hardness and a thickness of 10 $\mu$m–30 $\mu$m, the micro seal coating has a sufficient sealing effect with respect to a small uneven surface in the order of 5 $\mu$m–15 $\mu$m, such as a tool mark left on the sealing surface of the engine member. However, the micro seal coating can not effectively seal a slightly larger uneven surface like a V-notch and a step with a 20 $\mu$m–50 $\mu$m depth.

Especially, in the case that such a large scratch formed on the surface of the engine member crosses a sealing line formed by the bead or the like, a part of the scratch is not sufficiently sealed. Thus, the combustion gas, cooling water or oil may leak.

The leaking problem by the scratch, such as a V-notch, on the sealing surface of the engine member has been considered as a serious problem. This is because a relatively soft and fragile metal such as an aluminum alloy has been used for an engine member to reduce a weight of an engine. Also, even slight leak of the combustion gas, cooling water or oil needs to be prevented.

In view of the above problems, the present invention has been made. An object of the invention is to provide a cylinder head gasket formed of a single base plate, wherein the cylinder head gasket has a primary sealing portion having resistance to the combustion gas with a high temperature, and a secondary sealing portion for forming a seal line with an appropriate hardness to thereby obtain a good sealing ability and durability.

Further objects and advantages of the invention will be apparent from the following description of the invention.

SUMMARY OF THE INVENTION

In order to attain the above objects, a cylinder head gasket of the present invention is structured. In the first aspect of the invention, a cylinder head gasket is formed of a single metal base plate for sealing between a cylinder head and a cylinder block of an engine. The cylinder head gasket has a primary sealing portion including a grommet or shim around a cylinder bore, and a secondary sealing portion outside the primary sealing portion. The secondary sealing portion is formed of a bead and a foamed coating layer coated on one side or both sides of the bead to cover at least a portion of the bead in a belt shape.

The metal base plate is made of such a material as annealed stainless steel, heat-treated stainless steel (spring steel) and soft steel. The grommet or the shim is made of the annealed stainless steel, the soft steel or copper.

While the bead disposed on the secondary sealing portion is generally formed in a full bead, such as a circular arc or a trapezoidal shape, other type, such as a half bead, may be used depending on a sealing ability required for the engine.

The foamed coating layer is formed by coating a foam synthetic resin, such as a silicone resin containing micro capsules, on a surface of the metal base plate by a screen-printing at a foaming ratio of 200%–300%, with a thickness of 100 $\mu$m–200 $\mu$m and a width of 1 mm–5 mm. While the foamed coating layer is applied away from the grommet or shim of the primary sealing portion with a small space therebetween, the foamed coating layer may be connected to the grommet or shim. When there is an enough space, the foamed coating layer may be disposed with an appropriate space therebetween.

According to the structure, the grommet or shim of the primary sealing portion can withstand a high temperature of the combustion gas. Moreover, the grommet or shim has hardness to prevent the gasket from creep relaxation. In the secondary sealing portion, a secondary sealing line is formed of the bead and the foamed coating layer to thereby improve the sealing effect.

Also, since the foamed coating layer of the secondary sealing portion has a thickness greater than that of a micro seal coating layer, a difference in height created by the primary sealing portion can be absorbed. Moreover, since the foamed coating layer on the gasket surface covers the bead to contact the engine members, and has a relatively soft property for fitting, a sufficient sealing effect is achieved with respect to a scratch, such as a V-notch, larger than a tool mark, formed on the sealing surface of the engine member, such as the cylinder head.

Also, since the primary sealing portion is formed of a narrow sealing device, such as the grommet or shim, it is possible to apply to a smaller area associated with a reduced size of an engine. Further, the primary sealing portion prevents the high temperature combustion gas from contacting the secondary sealing portion to thereby protect the secondary sealing portion.

As the second aspect of the invention, the cylinder head gasket has a fluid hole sealing portion provided around the fluid hole. The fluid sealing portion is formed of a bead and a foamed coating layer coated on one side or both sides of the bead to cover at least a part of the bead in a belt shape.

The bead in the fluid hole sealing portion is generally formed in a half bead, since water or oil is sealed and the pressure thereof is not high. However, depending on a sealing property required for the engine, other shape, such as a full bead, may be used.

In the above structure, the fluid hole sealing portion can be formed by the same process as that of the secondary sealing portion of the cylinder bore, thus an additional production process can be eliminated to thereby reduce a production cost.

In the third aspect of the invention, the cylinder head gasket has a foamed coating layer in the secondary sealing portion. The foamed coating layer has a thickness thicker than that of the foamed coating layer in the fluid hole sealing portion.

The thickness of the foamed coating layer can be easily changed by a double coating process. Therefore, it is easy to design various sealing properties for the cylinder bore and the fluid hole.

Also, the foamed coating layer in the fluid hole sealing portion may have a higher foaming ratio than that in the secondary sealing portion.

In the cylinder head gasket, a micro seal coating layer is applied to the whole surface of at least one side of the cylinder head gasket where the foamed coating layer is coated. The micro seal coating is made of such a material as NBR rubber and fluoro rubber, and is applied to the substantially whole surface of the gasket by the screen printing to form a thin film having a hardness of H-2B of pencil hardness and a thickness of 10 µm–30 µm.

The micro seal coating provides a sealing effect with respect to an uneven surface with a micro depth of 5 µm–15 µm, such as a tool mark left on the sealing surface of the engine members. Also, since the foamed coating can be fixed on the surface, a flow of the foamed coating and creep relaxation due to the flow can be prevented.

In the cylinder head gasket, the foamed coating layer is formed of a foamed silicone coating. The micro seal coating layer is formed of a fluorine or NBR rubber coating.

Although other materials can be used for the foamed coating layer and the micro seal coating layer, the above described combination is especially preferable in view of the sealing ability and production.

BRIEF DESCRIPTION OF THE DRAWINGS

FIGS. 3(a)–3(f) are partial perspective views showing primary sealing portions of the cylinder head gasket, wherein FIGS. 3(a) and 3(b) show structures of grommets, FIGS. 3(c) and 3(d) show structures of a shim provided on one side, and FIGS. 3(e) and 3(f) show structures of shims provided on both sides;

FIGS. 4(a)–4(f) are partial section views showing secondary sealing portions and fluid hole sealing portions of the cylinder head gasket, wherein FIG. 4(a) shows a structure of a full bead and foamed coating layers provided on both sides, FIGS. 4(b) and 4(c) show structures of full beads and a foamed coating layer provided on one side, FIG. 4(d) shows a structure of a half bead and foamed coating layers provided on both sides, FIGS. 4(e) and 4(f) show structures of half beads and a foamed coating layer provided on one side.

DETAINED DESCRIPTION OF PREFERRED EMBODIMENTS

Hereunder, embodiments of a cylinder head gasket according to the present invention will be explained with reference to the accompanied drawings.

Figure 5:
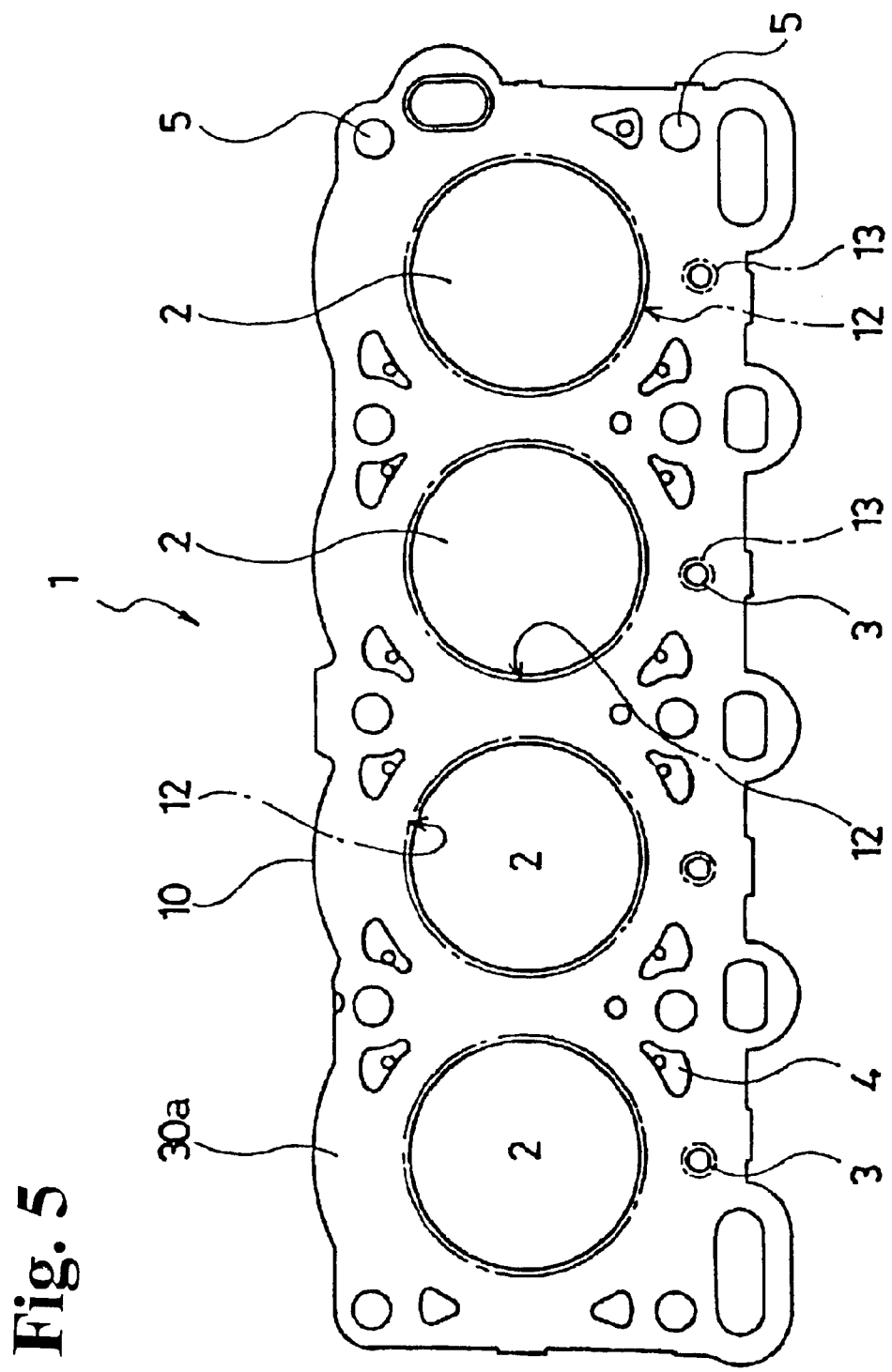
FIG. 5 is a plan view of the cylinder head gasket.

As shown in FIG. 5, a cylinder head gasket 1 of an embodiment according to the present invention is installed between a cylinder head and a cylinder block, i.e. a cylinder body, of an engine. The cylinder head gasket 1 seals combustion gas with a high temperature and pressure in a cylinder bore, and a fluid, such as cooling water and cooling oil, passing through a cooling water path and a cooling oil path.

Incidentally, FIGS. 1–4(f) is explanatory schematic views. A plate thickness, a dimension of a sealing groove and a length to width ratio of the cylinder head gasket are different from the actual ones for a demonstration purpose.

Figure 1:
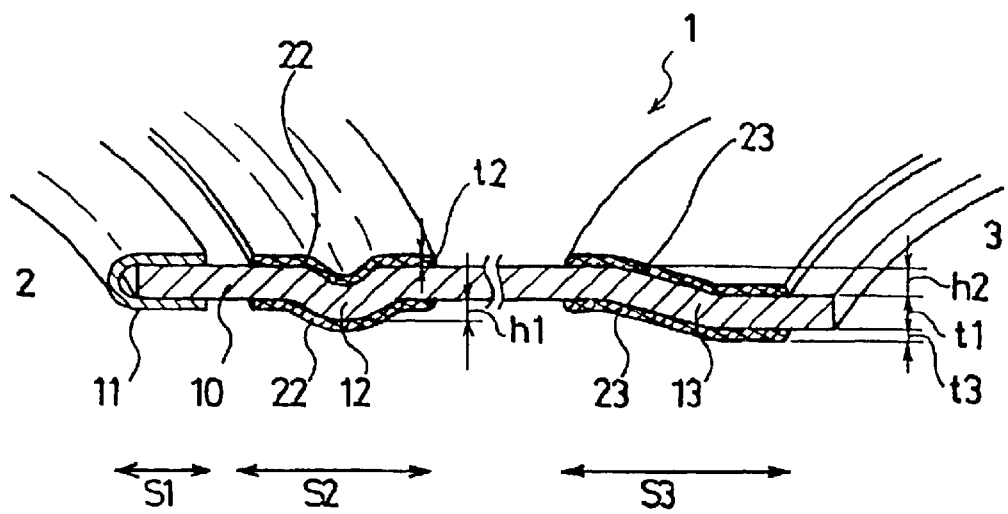
FIG. 1 is a partial perspective view showing a cylinder head gasket.

As shown in FIGS. 1 and 5, the cylinder head gasket 1 of the first embodiment according to the present invention is formed of a metal base plate 10 made of annealed stainless steel, heat-treated stainless steel (spring steel), soft steel or the like. The metal base plate 10 is formed to fit a shape of an engine member, such as a cylinder block, and a plurality of cylinder bores 2, fluid holes 3, 4, bolt holes 5 for tightening bolts and the like are formed therein.

In the present invention, along a circumferential edge of the cylinder bore 2 of the metal base plate 10, there is provided a grommet 11 made of an annealed stainless steel plate, soft steel plate or copper plate with a thickness of 0.1 mm–0.15 mm to constitute a primary sealing portion S1.

Also, a full bead 12 is provided outside the primary sealing portion S1, and a foamed silicone resin containing micro capsules is coated on both sides of the full bead 12 in a belt shape. The foamed silicone resin is coated by screen printing at a foaming ratio of 200% to 300% to form foamed coating layers 22 having a thickness t2 of 100 µm–200 µm and a width of 1 mm–5 mm to cover the full bead 12. A secondary sealing portion S2 is formed of the full bead 12 and the foamed coating layers 22 provided on both sides of the full bead 12.

Also, a half bead 13 is provided on a part of the fluid holes 3, such as a cooling water hole and oil hole. The foamed silicone resin containing the micro capsules is coated in a belt shape on both sides of the half bead 13 by the screen printing at a foaming ratio of 200%–300% to form a foamed coating layer 23 having a thickness t3 of 60 μm–150 μm and a width of 1 mm–5 mm to cover the half bead 13. A fluid hole sealing portion S3 is formed of the half bead 13 and the foamed coating layers 23 provided on both sides of the half bead 13.

The thickness t2 of the foamed coating layer 22 in the secondary sealing portion S2 is formed to be thicker than the thickness t3 of the foamed coating layer 23 of the fluid hole sealing portion S3. Also, the foaming ratio of the foamed coating layer 23 around the fluid hole sealing portion may be greater than that of the foamed coating layer 22 in the secondary sealing portion.

Figure 2:
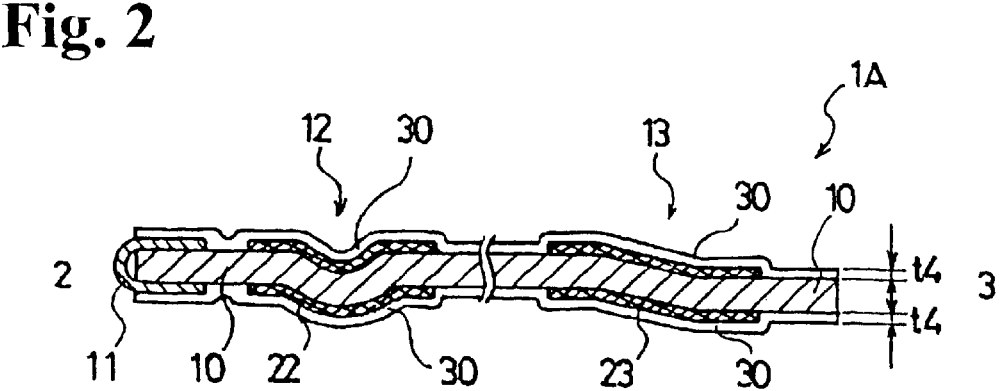
FIG. 2 is a partial section view of the cylinder head gasket.
Figure 3A:
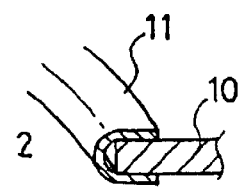
Figure 3B:
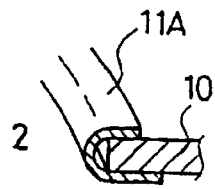
Figure 3C:
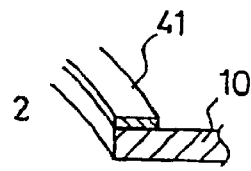
Figure 3D:
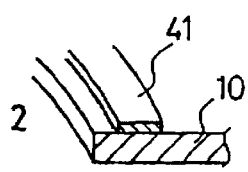
Figure 3E:
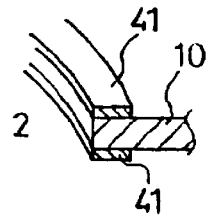
Figure 3F:
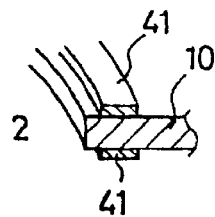

Further, in a cylinder head gasket 1A of the second embodiment of the invention as shown in FIG. 2, in addition to the structure of the cylinder head gasket 1 as shown in FIG. 1, a micro seal coating layer 30 having a hardness of H-2B in pencil hardness is formed by coating a material, such as NBR rubber and fluoro rubber on substantially whole surfaces on both sides of the gasket 1 through the screen printing.

Incidentally, the dimensions of a plate thickness and the like are, for example, as follows; a diameter of a cylinder bore is 80 mm, the thickness t1 of the metal base plate 10 is 0.15–0.4 mm; a height hi of the full bead 12 for the cylinder bore 2 is 0.2–0.3 mm; a height h2 of the half bead 13 for the fluid hole 3 is 0.2–0.4 mm; the thickness t2 of the foamed coating layer 22 is 100–200 μm; the thickness t3 of the foamed coating layer 23 is 60–150 μm; and a thickness t4 of the micro seal coating 30 is 10–30 μm.

Next, other embodiments are shown in FIGS. 3(a) to 4(f). FIGS. 3(a)–3(f) show embodiments of the primary sealing portion S1, wherein in FIGS. 3(a) and 3(b), grommets 11, 11A are provided, respectively; in FIGS. 3(c) and 3(d), a shim 41 is provided only on one side of the metal base plate; and in FIGS. 3(e) and 3(f), shims 41, 41 are provided on both sides of the metal base plate. The shim 41 has a thickness of 0.03–0.1 mm and is made of a material, such as annealed stainless steel, soft steel or copper.

Figure 4A:
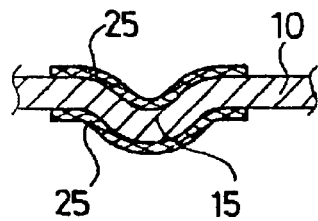
Figure 4B:
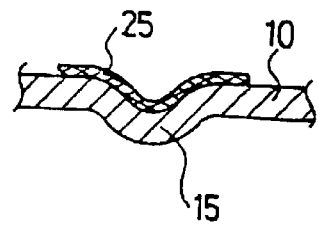
Figure 4C:
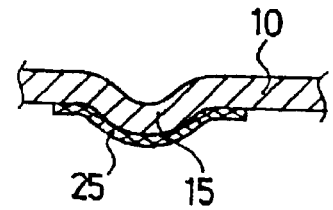
Figure 4D:
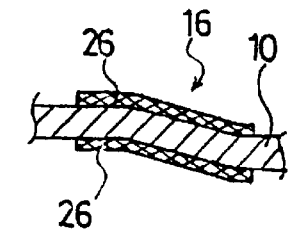
Figure 4E:
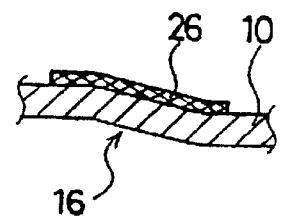
Figure 4F:
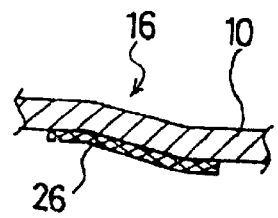

FIGS. 4(a)–4(f) show embodiments of the secondary sealing portion S2 and the fluid hole sealing portion S3. FIG. 4(a) shows a structure of the full bead 15 and the foamed coating layers 25 applied to both sides; FIG. 4(b) and FIG. 4(c) show structures of the full bead 15 and the foamed coating layer 25 applied only on one side, respectively; FIG. 4(d) shows a structure of the half bead 16 and the foamed coating layers 26 applied on both sides; and FIGS. 4(e) and 4(f) show a structure of the half beads 16 and the foamed coating layer 26 applied only on one side, respectively.

Incidentally, in the above embodiments, while the shape of the full bead 15 is represented by a circular arc shape, its shape may be a trapezoid or other shape, and the half bead 16 may also be a shape other than the one shown in the figures.

The cylinder head gasket with a necessary sealing ability depending on a type of the engine can be designed through a combination of the primary sealing portion S1, the secondary sealing portion S2, the fluid hole sealing portion S3, with or without the micro seal coating 30, and the one-side coating or the both-side coating.

As explained above, according to the cylinder head gasket of the present invention, the following effects can be obtained. Since a combination of the hard primary sealing potion with a good heat and creep resistance, and the soft secondary sealing portion with a good fitting ability is provided around a cylinder bore, a high sealing ability can be obtained.

More specifically, since the primary sealing portion close to the combustion chamber is formed of the grommet or shim made of metal, the first sealing portion has an excellent heat resistance. Also, since the primary sealing portion is; made of the hard metal, it has an excellent creep resistance to prevent an excessive decrease in torque. Moreover, the first sealing portion protects the second sealing portion.

Also, since the bead and the foamed coating layers of the second sealing portion seal the combustion gas leaked from the first sealing portion, an excellent sealing ability can be obtained.

Especially, since the foamed coating layer provided in the secondary sealing portion is thicker than the micro seal coating layer, a step produced by the primary sealing portion can be covered. A scratch, such as a V-notch, larger than a tool mark formed on the sealing surface of the member, i.e. cylinder head, can be covered by the foamed coating layer, which is relatively soft and has a fitting property, so that a good sealing ability can be obtained.

Also, since the fluid hole sealing portion is formed of the same bead and foamed coating layer as those in the secondary sealing portion, the fluid hole sealing portion can be formed at the same time in the same process as the secondary sealing portion, thus an additional production processes is eliminated to thereby reduce a production cost.

Therefore, a cylinder head gasket of a single plate having a good sealing ability, heat resistance and durability can be obtained.

While the invention has been explained with reference to the specific embodiments of the invention, the explanation is illustrative and the invention is limited only by the appended claims.

What is claimed is:

1. A metal gasket for an internal combustion engine with at least one cylinder bore and a plurality of fluid holes to be sealed, comprising:

a metal plate extending throughout an entire area to be sealed and having a first hole corresponding to the cylinder bore and at least one second hole corresponding to one of the fluid holes, a primary sealing portion disposed around the first hole and formed of one of a grommet and a shim, a secondary sealing portion disposed around the primary sealing portion to surround the same and formed of a first bead having two sides, and a first foamed coating layer disposed on at least one of the two sides of the first bead without extending to the primary sealing portion, and a fluid hole sealing portion disposed around the at least one second hole and formed of a second bead having two sides, and a second foamed coating layer disposed on at least one of the two sides of the second bead, said second foamed coating layer having a foaming ratio greater than that of the first foamed coating layer.

2. A metal gasket according to claim 1, wherein said first foamed coating layer has a thickness greater than that of the second foamed coating layer.

3. A metal gasket according to claim 1, further comprising a micro seal coating disposed on a substantially entire surface of the metal gasket.

4. A metal gasket according to claim 2, wherein said first foamed coating has a foaming ratio of 200–300% and a thickness of 100–200 $\mu$m, and said second foamed coating has a foaming ratio of 200–300% and a thickness of 60–150 $\mu$m.

5. A metal gasket according to claim 4, wherein said primary sealing portion is formed of the grommet having flanges deposed on upper and lower sides of the metal plate.

6. A metal gasket according to claim 4, wherein said primary sealing portion is formed of the shim spaced from an edge of the first hole.

* * * * *

UNITED STATES PATENT AND TRADEMARK OFFICE
CERTIFICATE OF CORRECTION

PATENT NO.     : 6,682,080 B2
DATED          : January 27, 2004
INVENTOR(S)    : Yoshio Miyaoh It is certified that error appears in the above-identified patent and that said Letters Patent is hereby corrected as shown below:

<u>Column 5,</u>
Line 29, change "hi" to -- h1- --; and

<u>Column 8,</u>
Line 3, change "deposed" to -- disposed --.

Signed and Sealed this

Sixteenth Day of March, 2004

JON W. DUDAS
*Acting Director of the United States Patent and Trademark Office*